Patented Apr. 10, 1951

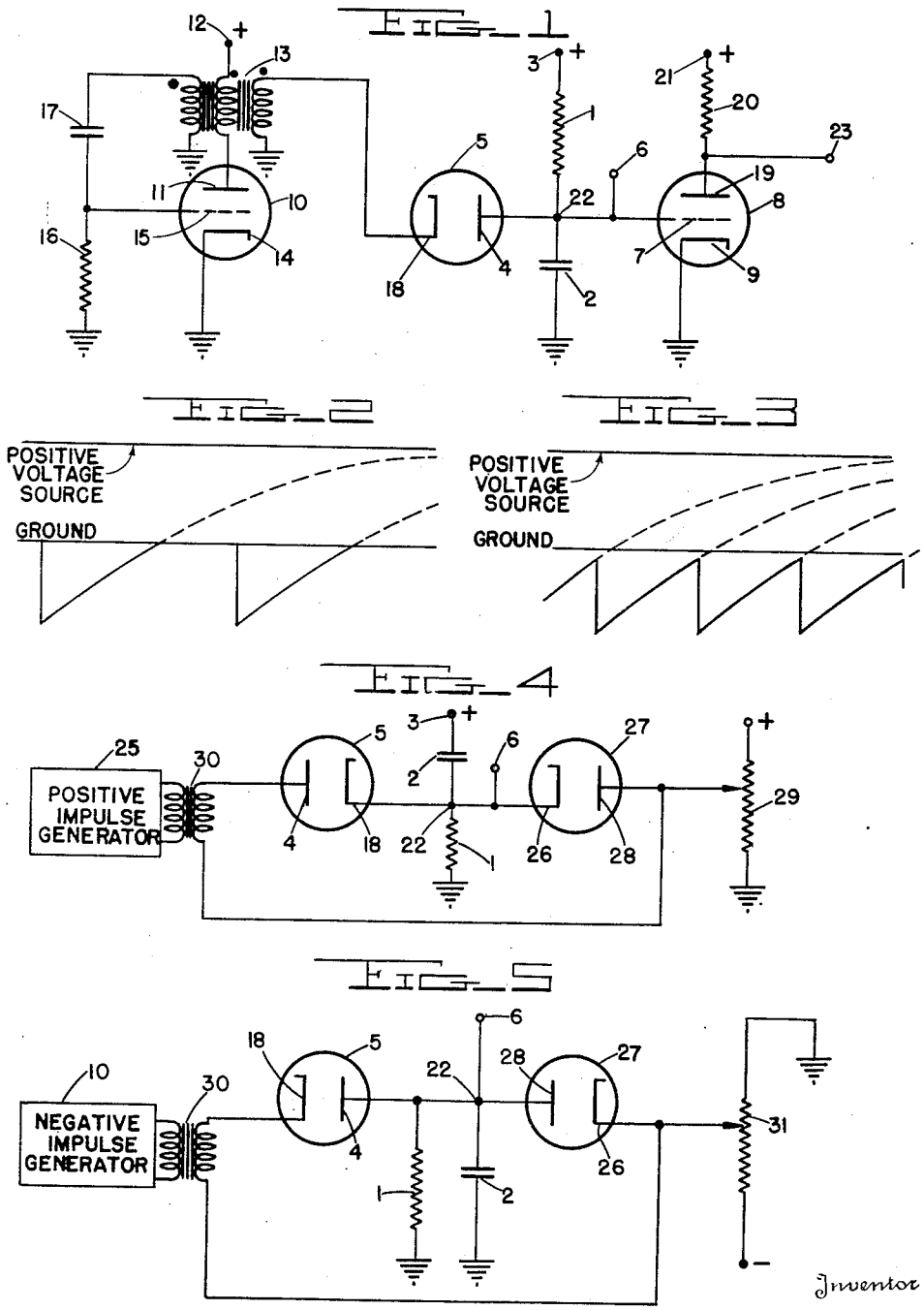

2,547,987

UNITED STATES PATENT OFFICE 2,547,987

SAWTOOTH VOLTAGE GENERATOR

Edwin C. Vestal, Jr., United States Navy

Application November 16, 1945, Serial No. 629,204

7 Claims. (Cl. 250—36)

(Granted under the act of March 3, 1883, as amended April 30, 1928; 370 O. G. 757)

This invention relates to a sawtooth voltage generator.

It is an object of this invention to provide a generator which will produce a sawtooth voltage having a very nearly vertical leading edge, or in other words, good "fly-back time."

It is another object of this invention to provide a generator which will produce a sawtooth voltage having a very nearly linear trailing edge.

It is a further object of the invention to provide such a sawtooth voltage generator which is simple in construction.

This invention will be described with reference to the drawings, in which:

Figure 1 shows in circuit diagram one embodiment of this invention;

Figures 2 and 3 show waveforms of the output voltage from the embodiment of Figure 1; and Figures 4 and 5 show partly in block diagram and partly in circuit diagram two other embodiments of this invention.

In Figure 1, resistor 1 and capacitor 2 are connected in series from positive potential source 3 to ground, with the resistor connected to the positive voltage source. To their junction point 22 is connected anode 4 of electronic switch 5. Also connected to the junction point are output terminal 6, and control grid 7 of electronic switch 8. The cathode 9 of tube 8 is directly grounded.

A negative impulse generator, which in the embodiment of Figure 1 is single-swing blocking oscillator 10, supplies a negative pulse, which drives the cathode 18 of electronic switch 5 negative with respect to anode 4, and thus causes a stream of electrons to flow onto the upper plate of capacitor 2. This charges capacitor 2 negatively to a point well below ground.

Anode 19 of electronic switch 8 is returned through load resistor 20 to positive potential source 21. It will be seen that control grid 7 and cathode 9 of this tube act as a diode switch, while the tube as a whole acts as a square wave generator. When capacitor 2 is charged to a negative potential as described, no current will flow from cathode 9 to grid 7; but when the potential on the grid rises above ground, there will be a flow of electrons from cathode to grid and thence through resistor 1 to positive voltage source 3. This will operate to clamp the upper extreme of the output voltage on terminal 6 at a point just above ground potential.

After capacitor 2 has been negatively charged by a stream of electrons from negative impulse generator 10, the only discharge path through which the electrons can flow is through resistor 1 to positive voltage source 3. Capacitor 2 discharges exponentially through this path, but before the potential on the upper plate reaches the potential of source 3, either electrons begin to flow from cathode 9 to grid 7 of tube 8 as already described, or else another injection of electrons through switch 5 occurs and drives the capacitor very negative again.

Figure 2 shows the waveform of the voltage at output terminal 6 under the first condition, when tube 8 clamps the rising voltage on the capacitor at a point just above ground potential. Figure 3 shows the waveform of the output voltage when recurrent negative pulses from impulse generator 10 prevent the capacitor voltage from ever reaching ground potential.

It will be seen that in both these cases only the first part of the exponential discharge path of capacitor 2 is used, not the whole range of voltage from the peak negative value to that positive potential toward which the capacitor discharges exponentially. Using only the first part of the exponential discharge path means that good linearity is produced in the trailing edge of the sawtooth voltage wave output. It also means that the voltage impulse from impulse generator 10 need not be equal in magnitude to said whole voltage range, but to only a fraction thereof.

Referring again to negative impulse generator 10 as exampled in Figure 1, anode 11 of this tube is returned to positive voltage source 12 through one winding of transformer 13. Cathode 14 of tube 10 is directly grounded. Control grid 15 is returned to ground through grid-leak resistor 16 and is connected through capacitor 17 to the second winding of transformer 13. The other end of this winding is grounded. The third winding of transformer 13 is connected between ground and cathode 18 of tube 5. The dots at the end of each of the three windings indicate similar polarities.

Tube 10 operates as a single-swing blocking oscillator which delivers a negative pulse to cathode 18 of tube 5. The output winding of transformer 13 and diode 5 present a low impedance path to the negative charging of capacitor 2 so that the time required for the charging of capacitor 2 is very small. In other words, the "fly-back" time of this sawtooth voltage wave is very short.

In the embodiment of Figure 1 the square wave voltage generated at anode 19 of electron tube 8 under alternate conduction and plate current cutoff is taken off at terminal 23. It may be employed as a blanking voltage or other control voltage which must be synchronized with the production of the sawtooth voltage.

However, if this square wave voltage is not required, then tube 8 may be a diode switch, which will of course exhibit the same clamping action as described above. Or, if desired, electron tube 8 may be omitted altogether and the constants of impulse generator 10 so chosen that the repetition rate of the impulse voltage therefrom will produce an output voltage having the waveform shown in Figure 3.

Figure 4 shows an embodiment of this invention in which a positive impulse generator 25 is employed in place of negative impulse generator 10. In this embodiment, capacitor 2 and resistor 1 are connected in series from positive voltage source 3 to ground, with the capacitor connected to the positive voltage source. Their junction point 22 is connected to the cathode 18 of switch tube 5, to output terminal 6, and to cathode 26 of switch tube 27. Anode 28 of switch tube 27 is connected to source 29, which provides a positive voltage of somewhat less magnitude than that provided by positive voltage source 3. Anode 4 of tube 5 is connected to end of secondary winding of transformer 30. The output of generator 25 is applied across the primary winding of transformer 30, while the other end of the secondary winding is connected to anode 28 of tube 27.

In the operation of the embodiment of Figure 4, a positive voltage impulse from generator 25 is impressed through transformer 30 on anode 4 of tube 5 of such a value that electrons will flow from cathode 18 to plate 4, reducing the voltage across capacitor 2 and raising the voltage of point 22 very rapidly. After current ceases to flow in tube 5, capacitor 2 begins to recharge exponentially through resistor 1 and will continue to charge until the voltage at point 22 is clamped by the action of switch tube 27. As before, the output voltage at terminal 6 will include only the first part of the exponential charging curve and so will exhibit good linearity.

Another embodiment of this invention is shown in Figure 5. In this system a negative voltage pulse from impulse generator 10 is applied across the primary winding of transformer 30, the secondary winding of which has one end connected to cathode 18 of diode 5 and the other end connected to cathode 26 of diode 27. This causes conduction in tube 5, charging capacitor 2 negatively. After capacitor 2 has been charged to a negative peak and conduction in tube 5 ceases, capacitor 2 discharges exponentially through resistor 1. Now, point 22 is connected to anode 28 of tube 27, and cathode 26 of that tube is connected to negative potential source 31. Thus, capacitor 2 will discharge until the potential at point 22 is equal to the potential of cathode 26 minus the potential drop across tube 27, when tube 27 will clamp the output voltage at that value.

It will be understood that the embodiments described are exemplary of the invention, the limits of which will be determined with reference to the appended claims.

This invention may be manufactured and used by or for the Government of the United States of America for governmental purposes without the payment of any royalties thereon or therefor.

What is claimed is:

1. A sawtooth voltage generator comprising a D. C. voltage source, impedance means, capacitor means, means connecting said impedance means and capacitor means in series across the power supply means, first unilateral impedance means conductively connecting the two plates of the capacitor means, unipotential impulse generator means, and second unilateral impedance means conductively connecting the impulse generator means to the capacitor means to charge the same with a polarity opposite to that of the D. C. voltage source and thereby to decouple the two plates of the capacitor means.

2. A sawtooth voltage generator comprising positive power supply means, resistor means, capacitor means, means connecting said resistor means and capacitor means in series across the power supply means with the resistor means connected to the positive terminal of the power supply means, negative impulse generator means, electronic switch means, and means connecting said generator means through said switch means to the junction point of the resistor means and capacitor means.

3. A sawtooth voltage generator comprising positive power supply means, resistor means, capacitor means, means connecting said resistor means and capacitor means in series across the power supply means with the resistor means connected to the positive terminal of the power supply means, negative impulse generator means, first electronic switch means, means connecting said generator means through said switch means to the junction point of the resistor means and capacitor means, second electronic switch means, and means connecting the two plates of the capacitor means through the second switch means.

4. A sawtooth voltage generator comprising first D. C. voltage source, impedance means, capacitor means, means connecting said impedance means and capacitor means in series across the D. C. voltage source, second D. C. voltage source of the same polarity as but less magnitude than the first D. C. voltage source, first unilateral impedance means conductively connecting one plate of the capacitor means to the second D. C. voltage source, unipotential impulse generator means, and second unilateral impedance means conductively connecting the impulse generator means to the capacitor means to charge the same with a polarity opposite to that of the original charge thereon and thereby to decouple the capacitor means from the second D. C. voltage source.

5. A sawtooth voltage generator comprising first positive power supply means, resistor means, capacitor means, means connecting said resistor means and capacitor means in series across the power supply means with the resistor connected to the negative terminal of the power supply means, positive impulse generator means, first electronic switch means, means connecting said generator means through said switch means to the junction point of the resistor means and capacitor means, second positive power supply means providing a potential less positive than that of the first positive power supply means, second electronic switch means, and means connecting said junction point through the second switch means to the second power supply means.

6. A sawtooth voltage generator comprising a D. C. voltage source, bilateral impedance means, capacitor means, first unilateral impedance means conductively connecting said bilateral impedance means and capacitor means in parallel across said D. C. voltage source, unipotential impulse generator means, and second unilateral impedance means conductively connecting the impulse generator means to the capacitor means to charge the same with the same polarity as the original charge thereon and thereby to decouple the capacitor means from the D. C. voltage source.

7. A sawtooth voltage generator comprising capacitor means, a D. C. voltage source having two output terminals, first unilateral impedance means, means conductively connecting one plate of the capacitor means to one of said terminals and the other plate of the capacitor means through said first unilateral impedance means to the other of said terminals, means generating unipotential voltage impulses, second unilateral impedance means, means applying said impulses to the capacitor means through the second unilateral impedance means to change the charge on the capacitor means very rapidly and in a substantially linear manner in one direction, and discharging means operative to change the charge on said capacitor means slowly and in a substantially linear manner in the opposite direction.

EDWIN C. VESTAL, Jr.

REFERENCES CITED

The following references are of record in the file of this patent:

UNITED STATES PATENTS

| Number | Name | Date |
|---|---|---|
| 1,613,954 | Knoop | Jan. 11, 1927 |
| 1,786,812 | Zworykin | Dec. 30, 1930 |
| 1,919,985 | Patterson | July 25, 1933 |
| 2,139,467 | Roosenstein | Dec. 6, 1938 |